United States Patent [19]
Alvarez et al.

[11] Patent Number: 5,797,229
[45] Date of Patent: Aug. 25, 1998

[54] FITTING ELEMENT FOR A DOOR, WINDOW OR THE LIKE

[75] Inventors: Eric Alvarez, Hommert; Bruno Charton, Saint Lye, both of France

[73] Assignee: Ferco International Ferrures et Serrures de Batiment, Sarrebourg, France

[21] Appl. No.: 835,606

[22] Filed: Apr. 9, 1997

[30] Foreign Application Priority Data

Apr. 10, 1996 [FR] France .................. 96 04638

[51] Int. Cl.⁶ .................................. E06B 3/964
[52] U.S. Cl. .................. 52/204.62; 52/204.64; 52/204.7
[58] Field of Search .............. 52/204.5, 204.55, 52/208, 214, 204.63, 204.64, 204.66, 204.7, 204.705, 204.62, 204.68, 204.65

[56] References Cited

U.S. PATENT DOCUMENTS

| | | | |
|---|---|---|---|
| 4,856,239 | 8/1989 | Elsasser | 52/200 X |
| 5,557,894 | 9/1996 | Card | 52/204.5 X |
| 5,653,073 | 8/1997 | Palmer | 52/204.62 X |
| 5,713,167 | 2/1998 | Durham et al. | 52/204.7 X |

FOREIGN PATENT DOCUMENTS

| | | | |
|---|---|---|---|
| 2359956 | 2/1978 | France | 52/204.5 |
| 3111785 | 10/1982 | Germany | 52/204.6 |
| 3149189 | 6/1983 | Germany | 52/204.5 |
| 3203253 | 8/1983 | Germany | 52/204.5 |
| 3213891 | 10/1983 | Germany | 52/204.5 |
| 3903038 | 9/1989 | Germany | 52/208 |
| 4100491 | 7/1991 | Germany | 52/208 |
| 2120714 | 12/1983 | United Kingdom | 52/204.5 |
| 2264740 | 9/1993 | United Kingdom | 52/204.5 |
| 2272244 | 5/1994 | United Kingdom | 52/204.5 |
| 2274866 | 8/1994 | United Kingdom | 52/204.5 |
| 92102706 | 2/1992 | WIPO | 52/208 |

*Primary Examiner*—Creighton Smith
*Attorney, Agent, or Firm*—Harrison & Egbert

[57] ABSTRACT

A hinging or locking fitting element for a door or window having a sash-frame and/or a leaf which is formed of an assemblage of profiles having a T-shaped groove in the fillister. The fitting element includes a base provided with a member for fixing in the T-shaped groove. This fixing member includes a hooking-in member cooperative with a hooking-in rim located in the fillister of the profile. The hooking-in member is in the shape of a bend parallel to the base and located at the free end of an extension perpendicularly extending at the rear edge of the base. The bend serves to position itself under the hooking-in rim extending parallel to the plane of the T-shaped groove.

9 Claims, 2 Drawing Sheets

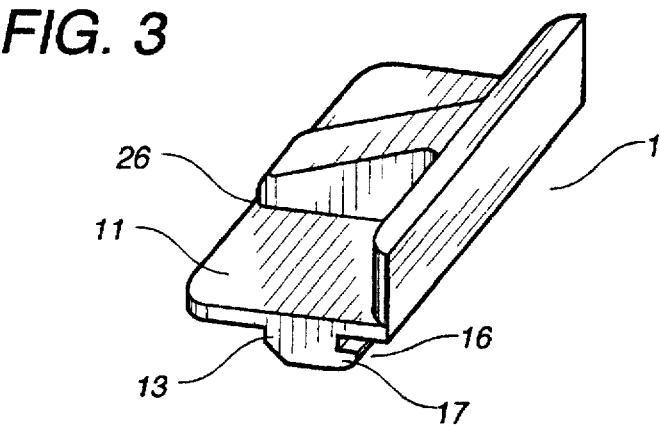
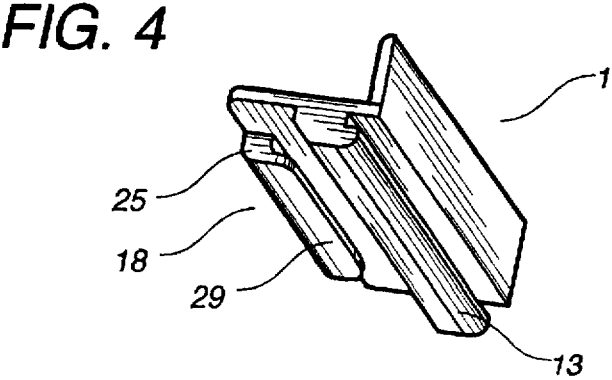
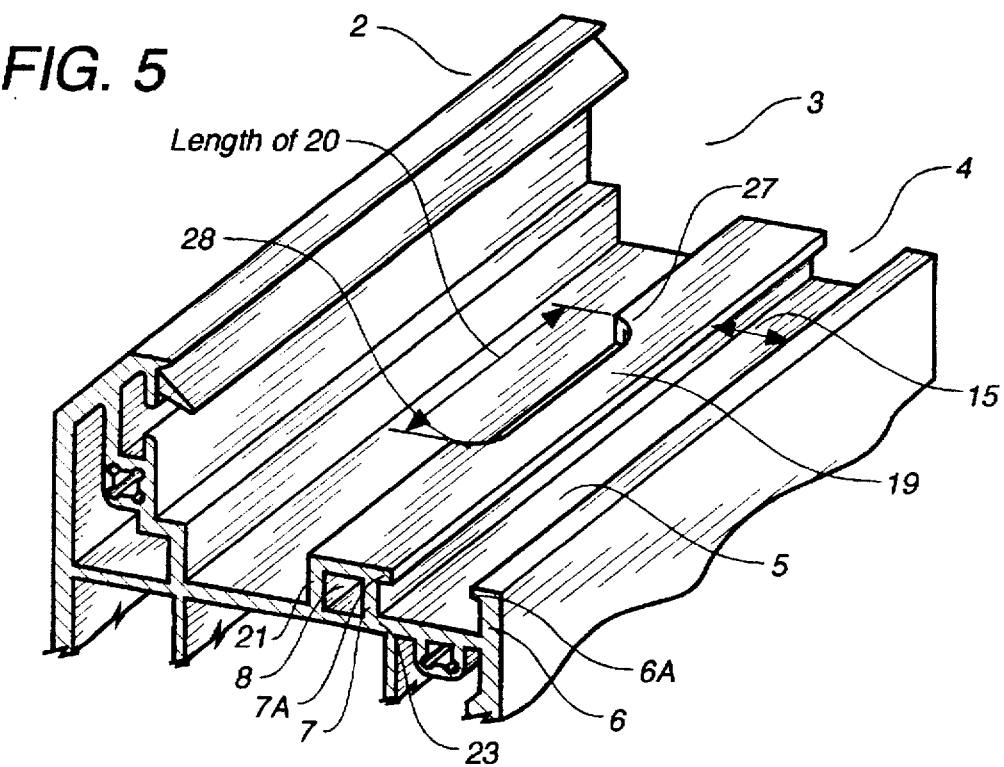

FITTING ELEMENT FOR A DOOR, WINDOW OR THE LIKE

BACKGROUND OF THE INVENTION

(1) Field of the Invention

The invention relates to a fitting element of the type hinging or locking fitting, in particular a keeper, for a door or window the sash-frame and/or the leaf of which are formed of an assembling of profiles, comprising in the fillister a T-shaped groove, said fitting element including a base provided with means for being fixed in such a T-shaped groove, these fixing means being completed by hooking-in means aimed at co-operating with a hooking-in rim located in the fillister of a profile.

This invention will find its application in the field of the building iron-mongery.

(2) Description of the Prior Art

An increasing number of doors and windows are made of aluminium or synthetic material, e.g. PVC, and in such a case very often arises the problem of the fixing of hinging and locking fittings on such profiles which, for being tubular, are often only little resistent to fixing organs, such as screws or the like. In addition, when profiles made of PVC are concerned, these problems are widely increased due to the flexibility of the material.

As a matter of fact, these profiles usually include in the fillister a T-shaped groove which is already now used to ensure a better mechanical connection between these profiles and the fitting elements which include fixing means which are actually aimed at co-operating with this T-shaped groove.

Such fixing means may adopt various embodiments. It is known to insert, through sliding and in the wide portion of the groove, a metal blade including tapped holes which fixing screws passing through the fitting element are going to co-operate with. Finally, such fixing blades act as It is also known to provide the base of a fitting element with a shoe capable of being inserted into said T-shaped groove including complementary means which, e.g. under the action of a screw, ensure the fixing and the clamping of this fitting element. Thus, these complementary means may be in the shape of a one or several hooking pawls which, during the mounting and the dismantling of the fitting element, are capable of withdrawing in said shoe and which, on the other hand, under the action of a screw, are capable of hooking in under the bends delimiting the passage at the level of said T-shaped groove.

If one merely uses such fixing means to make integral with the profile the fitting element, e.g. a keeper, this latter is only little resistent under the action of a force f transmitted e.g. by a locking organ. The T-shaped groove is indeed often delimited, on its one side, by a simple extension of the outer wall of the profile. When this latter is made of PVC, this extension of the wall easily gives way under this force, until reaching the disengagement of the keeper.

In this respect, there is also known a keeper which is fixed in a T-shaped groove of a profile of the sash-frame, this keeper including a base provided with means for the fixing in said groove and completed with hooking-in means aimed at co-operating with a hooking-in rim at the level of the profile. This hooking-in rim is here defined by one of the side walls delimiting the T-shaped groove.

Therefore, the application onto this keeper a force f substantially perpendicular to the sash-frame will result into causing the side walls of this T-shaped groove to pivot and into causing the disengagement and the extraction of the keeper.

One will indeed observe that the application of such a force f leads to the application onto the keeper of a force the component of which is oriented perpendicularly to the plane of the groove resulting from the pivoting of this keeper about one of the side walls and actually tending to extract same from this T-shaped groove.

To cope with this problem, there has been, until now, no solution but completing the already relatively complex fixing means with fixing organs, such as screws, rivets or the like.

Finally, one observes that the mounting of such a fitting element on a profile of the kind mentioned above is tedious and time-taking. One has indeed to act on one, or even several screws in order to achieve the result, not forgetting, should the case arise, the drillings which have to be carried out at the level of the profile for receiving this or these screws.

SUMMARY OF THE INVENTION

As a result, this invention was aimed at finding a solution for the above-mentioned problems and at finally authorizing a reliable mounting through snapping-in of a fitting element on such a profile.

To this end, the invention relates to a hinging or locking fitting element, in particular a keeper, for a door or window the sash-frame and/ leaf of which are formed of an assembling of profiles, comprising in the fillister a T-shaped groove, said fitting element including a base provided with means for being fixed in such a T-shaped groove, these fixing means being completed by hooking-in means aimed at co-operating with a hooking-in rim located in the fillister of a profile, characterized in that the hooking-in means are in the shape of a bend parallel to the base and located at the free end of an extension perpendicularly extending at the rear edge of this base, in mounted position of the fitting element, said bend being aimed at positioning itself under the hooking-in rim extending parallelly to the plane of the T-shaped groove and in an opposite direction with respect to this latter.

Preferably, the hooking-in rim is defined by a slit made in a stiffening chamber in the fillister of a profile and contiguous to the T-shaped groove.

Advantageously, the base of this fitting element includes means for the fixing, through snapping-in, in the T-shaped groove.

The advantages resulting from this invention consist in that under the action of a force substantially perpendicular to the leaf or to the sash-frame in the fillister of which is mounted the fitting element, this latter cannot get separated from the profile because of the hooking-in means co-operating with the hooking-in rim defined through the slit made in the stiffening chamber of said profile.

Finally, one observes that the design according to the invention allows the mounting by simply snapping in this fitting element on said profile. In this respect, there should be noticed, in particular, that the slit made in this profile can be so determined, as far as its dimensions are concerned, that the limits of this slit in addition ensure a locking in translation of the fitting element.

Finally, this invention allows the elimination of the screws which until now were absolutely necessary in order to impede a fitting element from disengaging from the groove of a profile made of PVC, in addition to the fact that the fitting element, when same is e.g. a keeper, can also be made of synthetic material.

The invention will be better understood when reading the following description which relates to an embodiment shown in the attached drawing.

BRIEF DESCRIPTION OF THE DRAWINGS

FIG. 3 is a top and frontal perspective view of the fitting element of the present invention.

FIG. 4 is a bottom and frontal perspective view of the fitting element of the present invention.

FIG. 5 is a top perspective view of the profile of a sash-frame or leaf of a door suitable for receiving the fitting element of the present invention.

DESCRIPTION OF THE PREFERRED EMBODIMENTS

Figure 1:
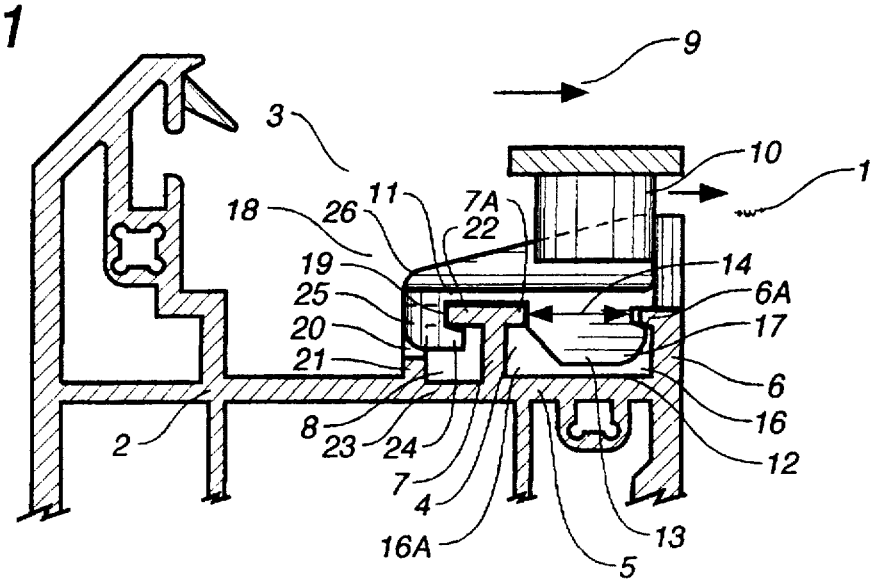
FIG. 1 is a schematical and cross-sectional view of the profile, of a sash-frame of a door, window or the like, receiving a fitting element according to the invention.
Figure 2:
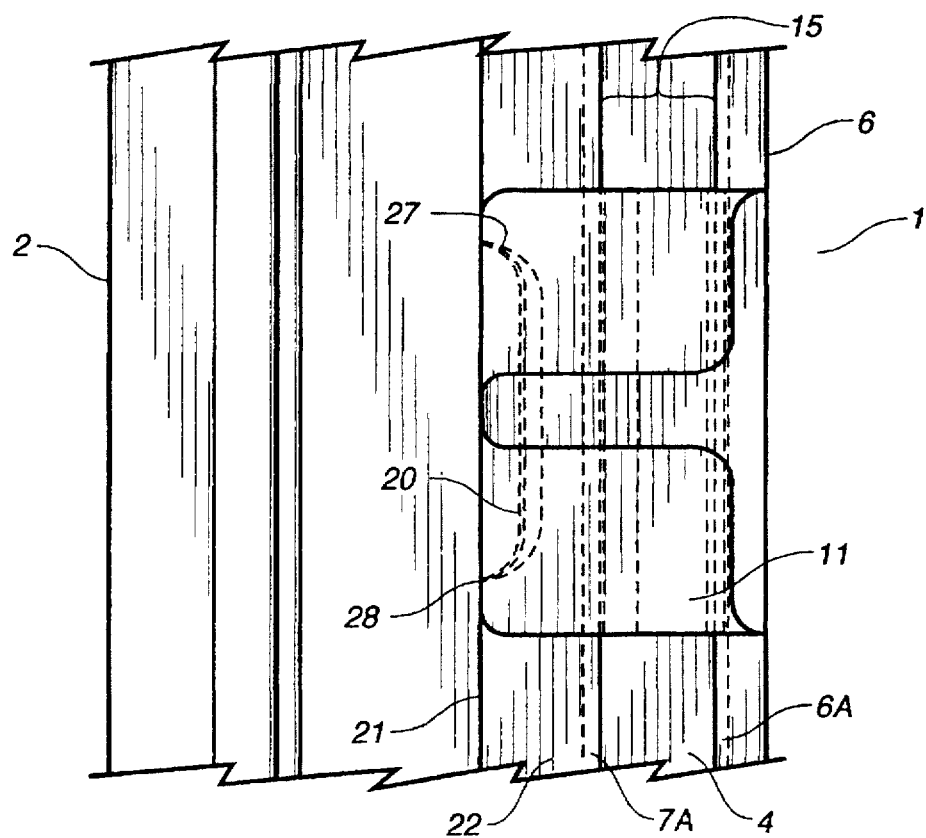
FIG. 2 is a schematical and plan view of this fitting element in the shape of a keeper mounted on a profile including a T-shaped groove.

This invention deals with the problem of the fixing of a fitting element 1, in particular a keeper as shown in FIGS. 1 and 2, on a profile 2 made of PVC, of a sash-frame or a leaf of a door, window or the like.

Such profiles 2 include, usually in the fillister 3, a T-shaped groove 4 the bottom 5 of which is perpendicular to the plane of the door, window or the like. This groove 4 is furthermore delimited by side walls 6, 7 which are arranged parallelly to this plane of the door or window and which include, at their free end, a bend 6A, 7A directed one towards the other. In addition, such a T-shaped groove 4 is advantageously contiguous to a stiffening chamber 8 defined at the level of this profile 2.

As regards the fitting element 1, this must be fixed on such a profile 2 in such a way as to withstand some constraints. In this respect, it should have an important tear resistence, irrespective of this profile 2 being of a metallic type or made of PVC.

Thus, as shown in FIG. 1, when this fitting element 1 is in the shape of a keeper, it must withstand a force f which would be applied to same through a locking organ 10 which has been shown in the shape of a roller in FIG. 1.

For this purpose, such a fitting element 1 includes a base 11 provided with fixing means 12 aimed at co-operating with the T-shaped groove 4.

Preferably, these fixing means 12 are in the shape of a shoe 13 integral with the lower face of the base 11 and the width 14 of which is adjusted to the passageway 15 preserved at the level of the groove 4, between both bends 6A, 7A. This shoe 13 includes, in addition, at its one lateral side 16 in front of one of these bends 6A, 7A of the T-shaped groove 4, a rim forming a step 17 anchoring itself under said bend 6A or 7A.

Preferably, at its lateral side 16A, this shoe is bevelled, which finally facilitates its fitment into the T-shaped groove 4, as set forth hereafter in the description.

According to the invention, these fixing means 12, which finally authorize a mounting through snapping-in of the fitting element 1 on the profile 2, are completed with hooking-in means 18 aimed at co-operating with a hooking-in rim 19 located in the fillister 3 of the profile 2 and extending parallelly to the plane P of the T-shaped groove 4 and in an opposite direction with respect to this latter.

Preferably, said hooking-in rim 19 is defined through a slit 20 made in the stiffening chamber 8 contiguous to said T-shaped groove 4.

When referring to FIG. 1, one will observe, in this respect, that this stiffening chamber 8 is delimited, on the one hand, by two walls 7, 21 parallel to the plane of the door, window or the like, one 7 of which is shared with said T-shaped groove 4, and, on the other hand, by two perpendicular walls 22, 23, one 22 of which is substantially located in the extension of the bend 7A of the side wall 7 and the other one 23 of which is located in the extension of the bottom 5 of the T-shaped groove 4.

Thus, the slit 20 is, in this case, preferably made partly in the wall 21 and partly in the perpendicular wall 22, this latter defining the hooking-in rim 19.

As far as the hooking-in means 18 are concerned, they are in the shape of a bend 24, parallel to the base 11, located at the free end of an extension 25 perpendicularly extending at the rear edge 26 of this base 11. Finally, in mounted position of the fitting element 1, said bend 24 is aimed at positioning itself under the anchoring rim 19 so as to avoid the tilting of this fitting element 1 with respect to the T-shaped groove 4.

In this respect, one will observe that the mounting of the fitting element 1 on the profile 2 occurs as follows:

the bend 24 is positioned under the hooking-in rim 19, then, through rotation about an axis substantially formed by said hooking-in rim, the shoe 13 is pushed into the T-shaped groove 4, until the anchoring of the rim forming a step 17 under the bend 6A is achieved.

As can be seen in FIG. 2, the length of the slit 20 may be so determined that its limits 27, 28 impede a translation motion of the fitting element 1 with respect to the profile 2. In particular, the length of this slit 20 is preferably adjusted to the length of the extension 25 perpendicularly extending at the rear edge 26 under the base 11.

Finally, from the preceding description one observes that by authorizing a mounting through snapping-in of the fitting element 1 on the profile 2, the fixing means 12, completed with hooking-in means 18, result into an exceptional tear resistence of this fitting element 1 with respect to said profile 2, this irrespective of the material this latter or also said fitting element are made of.

What is claimed:

1. A hinging or locking fitting apparatus for a door or window, the door or window being of the type formed of an assembling of profiles, the apparatus comprising:

a profile having a fillister with a T-shaped groove formed therein, said profile having a hooking-in rim formed in said fillister so as extend in parallel relation to said groove and in an opposite direction to said groove; and a fitting element having a base with means for fixing said fitting element in said groove of said profile, said means comprising a hooking-in member engaged in said hooking-in rim, said base having a rear edge with an extension extending perpendicular to said base, said extension having a bend formed at an end of said extension opposite said base, said bend extending in parallel relation to said base, said bend forming said hooking-in member.

2. The apparatus of claim 1, said profile having a stiffening chamber formed in said fillister and contiguous with said T-shaped groove, said hooking-in rim being a slit formed in said stiffening chamber.

3. The apparatus of claim 1, said profile having a stiffening chamber formed in said fillister contiguous to said groove, said T-shaped groove being defined by two side walls arranged parallel to each other, each of said side walls having a bend extending parallel to a bottom of said groove, said stiffening chamber being defined by two walls, one of said two walls of said stiffening chamber being common with one of said two side walls of said groove, said stiffening chamber being further defined by a first perpendicular wall which extends between said two walls and extends from said bend of said one of said side walls, said stiffening chamber being further defined by a second perpendicular wall which extends between said two walls and extends from a bottom of said groove, said hooking-in rim being defined by a slit formed partly in one of said two walls of said stiffening chamber and partly in said first perpendicular wall.

4. The apparatus of claim 3, said slit having a length suitable for restricting translation motion of said fitting element within said profile.

5. The apparatus of claim 1, said hooking-in member being a bend formed parallel to said base and located at an opposite end of an extension extending perpendicularly from a rear edge of said base, said hooking-in rim being formed by a slit extending along a stiffening chamber formed in said fillister of said profile, said stiffening chamber being contiguous with said T-shaped groove, said slit having a length corresponding to a length of said extension.

6. The apparatus of claim 1, said means for fixing is snap-fitting said fitting element onto said profile.

7. The apparatus of claim 1, said T-shaped groove being defined by side walls arranged in parallel relationship, each of said side walls having an end provided with a bend such that the bend of one of said side walls faces the bend of the other side wall, said side walls defining a passageway therebetween, said base having a lower face provided with a shoe forming said means for fixing, said shoe having a width fitting within said passageway, said shoe having a lateral side in front of one of the bends, said shoe having a rim extending from said lateral side forming a step anchored under one of the bends.

8. The apparatus of claim 7, said shoe having another lateral side opposite the lateral side with the rim extending therefrom, said shoe being bevelled at said another lateral side.

9. The apparatus of claim 1, said fitting element being formed of a synthetic material.

* * * * *